(12) United States Patent
Olsen et al.

(10) Patent No.: US 7,308,498 B1
(45) Date of Patent: Dec. 11, 2007

(54) SYSTEM AND METHOD FOR AUTOMATING A REQUEST FOR ACCESS TO A RESTRICTED COMPUTER ACCESSIBLE RESOURCE

(75) Inventors: Thomas Olsen, Issaquah, WA (US); Ricard Roma i Dalfó, Bellevue, WA (US); Isaac Nichols, Kirkland, WA (US); Ashok Kuppusamy, Seattle, WA (US); Jacob Eisdorfer, Hollywood, FL (US)

(73) Assignee: Microsoft Corporation, Redmond, WA (US)

( * ) Notice: Subject to any disclaimer, the term of this patent is extended or adjusted under 35 U.S.C. 154(b) by 898 days.

(21) Appl. No.: 10/365,935

(22) Filed: Feb. 13, 2003

(51) Int. Cl.
*G06F 13/00* (2006.01)
(52) U.S. Cl. .................. 709/225; 455/411; 455/410; 455/41.2; 709/224; 709/217
(58) Field of Classification Search ........ 709/224–226, 709/217; 726/3; 705/25, 26; 701/207; 713/193, 713/200
See application file for complete search history.

(56) References Cited

U.S. PATENT DOCUMENTS

| | | | |
|---|---|---|---|
| 6,006,190 A | 12/1999 | Baena-Arnaiz et al. ........ 705/1 |
| 6,189,146 B1 | 2/2001 | Misra et al. ................... 717/11 |
| 6,246,409 B1 | 6/2001 | Veghte et al. ............... 345/356 |
| 6,360,254 B1 | 3/2002 | Linden et al. .............. 709/219 |
| 6,385,613 B1 | 5/2002 | Grewell et al. ................. 707/8 |
| 6,453,344 B1 | 9/2002 | Ellsworth et al. ........... 709/220 |
| 6,470,339 B1 | 10/2002 | Karp et al. ..................... 707/8 |
| 6,871,140 B1 * | 3/2005 | Florance et al. ............ 701/207 |
| 6,934,852 B2 * | 8/2005 | Daniels et al. ................. 726/3 |
| 7,028,003 B2 * | 4/2006 | Senker ........................ 705/26 |
| 2002/0147917 A1 * | 10/2002 | Brickell ...................... 713/193 |
| 2002/0162008 A1 * | 10/2002 | Hill ........................... 713/200 |

* cited by examiner

*Primary Examiner*—David Wiley
*Assistant Examiner*—Jude J Jean-Gilles
(74) *Attorney, Agent, or Firm*—Merchant & Gould

(57) ABSTRACT

Methods and systems are provided for automating a request for access to computer accessible resources. If access to a computer accessible resource is denied, an automated request for access may be forwarded to a provider of the resource without the need for the requestor to know the identity and/or address of the provider. If the provider grants access to the requestor, access may be automatically granted, or access may be granted along with a notification to the requestor of the granted access.

34 Claims, 3 Drawing Sheets

SYSTEM AND METHOD FOR AUTOMATING A REQUEST FOR ACCESS TO A RESTRICTED COMPUTER ACCESSIBLE RESOURCE

FIELD OF THE INVENTION

This invention relates generally to methods of systems for allowing a user to request access to computer accessible resources.

BACKGROUND OF THE INVENTION

With the advent of high volume use of computers and computer accessible resources in recent years, computer users often have access to or desire access to a wide variety of data including word processing documents, spreadsheets, databases and Internet-based data. Computer users obtain access to such information via sources maintained on their local computers, or via a wide variety of distributed sources such as Internet or Intranet-based servers. Often, access to a particular resource is restricted. That is, a user must obtain permission from the owner of the resource to access the resource. For example, a user may desire to obtain a document via an Internet-based web page. If the user attempts to connect to the web page to obtain access to a resource contain thereon, the user may receive an error message indicating that the user's access is denied. The user must obtain the identity of the owner of the desired resource in order to contact the owner to ask for permission to access the desired resource. This is often difficult, because the user may not be able to obtain the identity of the owner, and even if the user does obtain the identity of the owner, the user may be required to e-mail, mail, fax, or telephone the owner to request access to the desired resource. This process can be time consuming and cumbersome, and often owners of such resources may not release their identities or contact information to prospective users.

Accordingly, there is a need for methods and systems or providing an automated request for access to allow users to request access to desired resources. It is with respect to these considerations and others that the present invention has been made.

SUMMARY OF THE INVENTION

Embodiments of the present invention provide methods and systems for automating a request for access to computer accessible resources. If access to a computer accessible resource is denied to a user, an automated request of access may be forwarded to the provider of the resource without the need for the requestor to know the identity or address of the provider. If the provider grants access to the requestor, access may be automatically granted, or access may be granted along with a notification to the requestor to the granted access.

More particularly, according to embodiments of the present invention, a user desiring access to a computer-accessible resource, such as an Internet-based web page, a document, a spreadsheet, a database filed, or other computer accessible data, attempts to access the desired resource. If the user's access is denied, an access denied notification is sent to the user. An access request page is forwarded to the user. The access denied notification and the access request page may be in the form of an Internet-based web page, or an electronic mail transmission, or attachments to an electronic main transmission. If the user returns the access request page, the user is authenticated to determine whether the user is from a trusted source from which communication to the resource provider is accepted. If the user is authenticated for potential access to the desired resource, the user is provided a request for access application with which the user may provide a message to the resource provider indicating the nature of the user's desired access. The request for access application is forwarded to the resource provider.

At the resource provider, a determination is made as to whether access to the desired resources should be granted to the user/requestor. If access is granted, the resource provider may grant general unrestricted access by the user to the desired resource, or the resource provider may grant selected access, such as "read only" access, "read and write" access, or access for a limited duration. A notification may be sent to the user to notify the user of the granted access. If the resource provider does not grant a desired access, the user may be notified that access is denied.

These and other features, advantages, and aspects of the present invention may be more clearly understood an appreciated from a review of the following detailed description of the disclosed embodiments and by reference to the appended drawings and claims.

DETAILED DESCRIPTION OF THE PREFERRED EMBODIMENT

The following description of embodiments of the present invention is made with reference to the above-described drawings wherein like numerals refer to like parts or components throughout the several figures. The present invention is directed to methods and systems for allowing a user to request access to computer accessible resources.

Operating Environment

Figure 1:
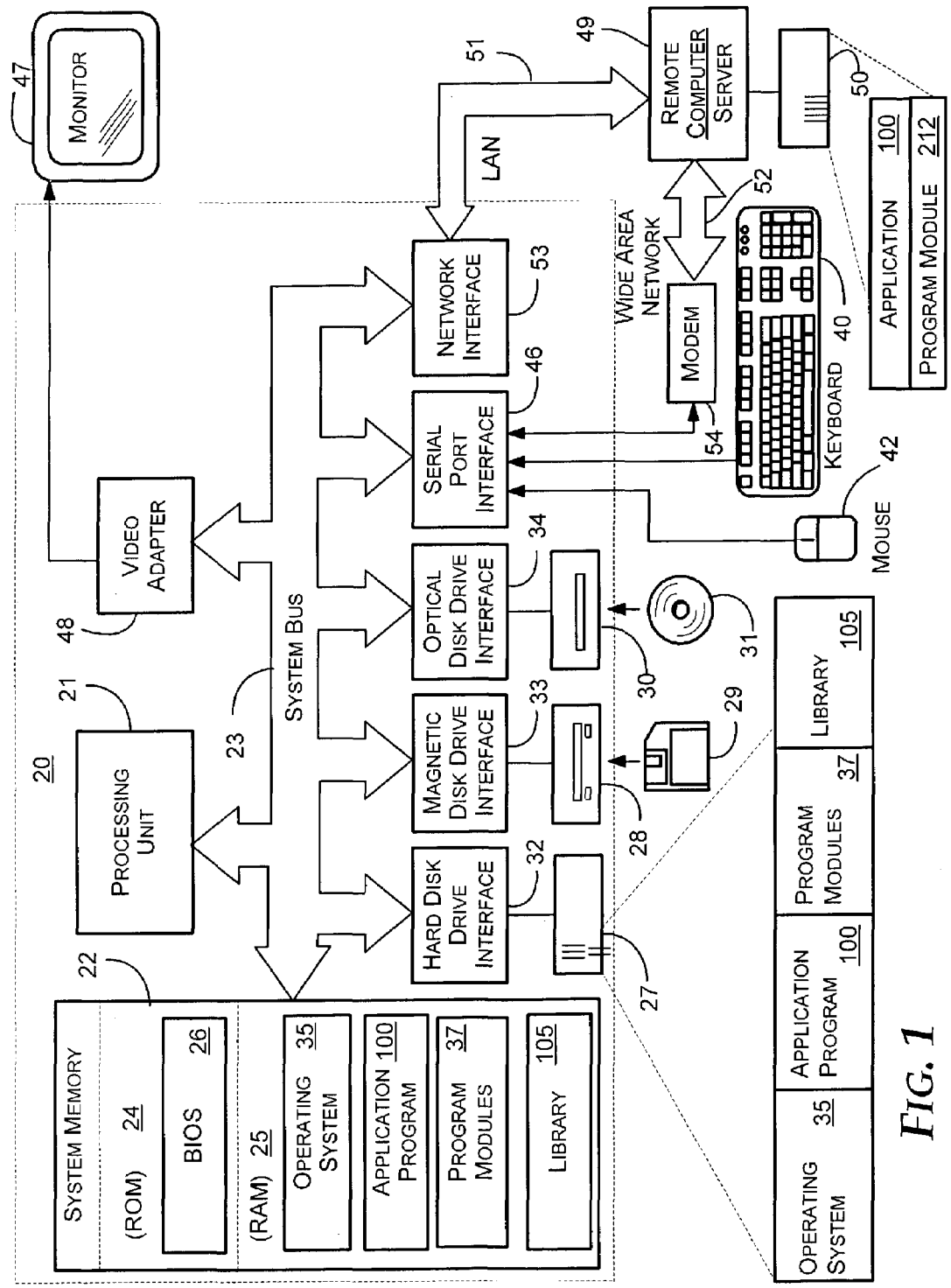
FIG. 1 is a block diagram of a computer an associated peripheral and networked devices that provide an exemplary operating environment for the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 100, a word processor program module 37 (or other type of program module), program disk, such as the access request program module 212, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a netorked environment, program modules depicted relative to the personal computer 20, or portions thereof, may be stored in the remote memory storage device. It will be appreciated that the network connections shown are exemplary and other means of establishing a communications link between the computers may be used.

Operation

Figure 2:
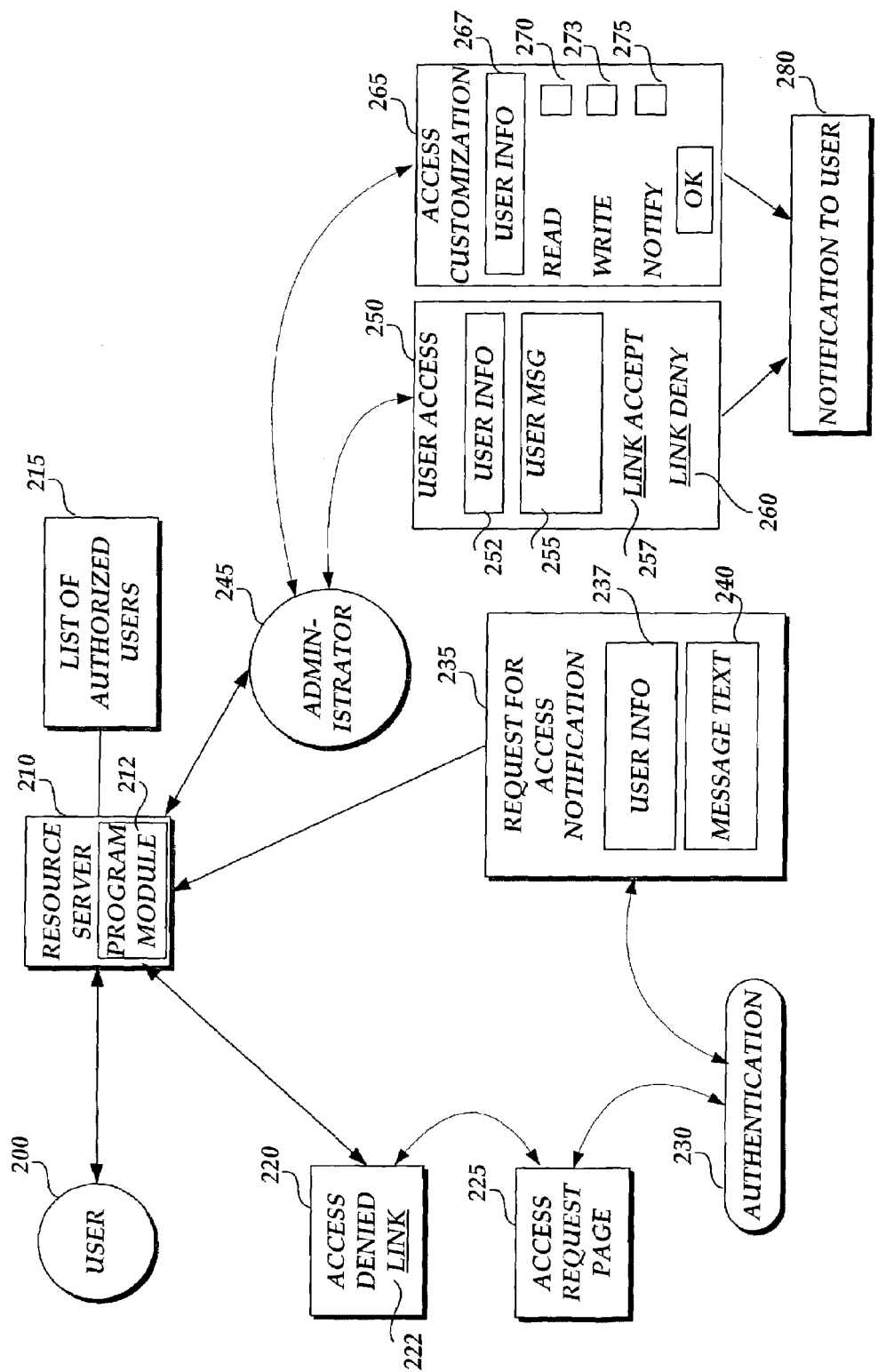
FIG. 2 is a simplified block diagram illustrating interaction between the user and a resource provider for requesting access by the user to resources maintained by the resource provider.

Referring now to FIG. 2, according to embodiments of the present invention, a user 200 is illustrated for requesting access to resources contained on a resources server 210. Resources server 210 may be a server connected directly to the user's computer 200, or may be accessible to the user 200 via a distributed computing environment such as an Intranet-based server 210 or and Internet-based server 49, illustrated in FIG. 1. The resources server 210, may be a web server from which Internet-based web pages are obtained, or the resources server 210 may be a server containing documents, spreadsheets, database, and the like desired by the user 200. The server 210 is illustrative of a plurality of servers operated by a plurality of resource providers. An additional server or servers (not shown) may be provided for coordinating requests for access to the resources servers 210. A list of authorized users 215 is associated with the resource server for providing the resource server with a list of users that are authorized to obtain access to resources contained on the resources server 210.

According to an embodiment of the present invention, an access request program module 212 is resident on the resources server 210 and contains computer implementable instructions which when implemented by a computer 20 of the resources server 210 is operative to parse the list of authorized users 215 to determine whether a particular user 200 is authorized for access to the resources of the resources server 210. The program module is also operative to forward the access denied notification 220 and access request page 225 to the user 200. The program module 212 is further operative to receive the request of access application 235 from the user 200 after authentication of the user and for forwarding the information contained in the request of access application 235 to the administrator 245. The program module is further operative to provide the administrator 245 with a user access page 250 and to accept input from the administrator 245 via the access link 257 or the deny link 260. The program module is further operative to provide an access customization page 265 to the administrator 245 for allowing the administrator to customize access granted to the user 200, as described above. It should be understood by those skilled in the art, that the program module 212 may be maintained and operated from the resources server 210 or the program module 212 may be maintained and operated via a separate server (not shown) for processing requests for access from users 200 directed to one or more resource servers 210.

An access denied notification 220 with a link to 222 is illustrated for sending to a user from the resources server 210 if the user's desired access to the resources server 210 is denied. A link 222 is provided for obtaining a access request page 225 through which the user 200 may request access to the desired resources contained on the resources server 210. An authentication module 230 is provided for authenticating the user. As is understood by those skilled in the art, authentication is a process whereby a user requesting access to a desired resource contained on the resources server 210 is authenticated as being from a trusted source from which communication is accepted before the user is allowed to submit a request for access to the resources server 210. A request of access application 235 is illustrated for providing user information 237 such as the user's name, e-mail address, and authentication data to the resources server 210. A message text box 240 is provided to allow the user to enter a text message setting out the user's desired access to the resources of the resources server 210.

An administrator 245 is illustrative of an administrator of the resources of the resources server 210 tasked with responding to requests for access from users 200. As should be understood, the functionality of the present invention may be deactivated by the resource provider so that no requests for access are accepted during the period of deactivation. That is, according to one embodiment, the administrator 245 may deactivate the program module 212 or set the program module to an "off" position to prevent request for access. A user access page 250 is provided for allowing the administrator to review user information 252 such as the user's name, e-mail address and authentication data. A user message box 255 is provided for allowing the administrator to review a text message sent by the user 200 setting out the desired access to the resources of the resources server 210. An accept link 257 is provided for allowing the administrator to accept the user's request for access to the resources of the resources server 210. A deny link 260 is provided for allowing the administrator to deny access to the resources by the user 200.

According to one embodiment of the present invention, the administrator may utilize an access customization page 265 in which the administrator may customize the type of access to the user 200. A user information box 267 may provide identifying information for the user such as the user's name, e-mail address and authentication data. According to the exemplary embodiment illustrated in FIG. 2, a "read" check box 270 is provided for allowing the administrator to designate that the user 200 may have access to the desired resources in a "read only" manner. The "write" check box 273 may be utilized by the administrator 245 to designate that the user may have "read and write" access to the desired resources. The "notify" check box 275 may be utilized by the administrator 245 to forward an electronic notification to the user 200 that the user has been granted access to the desired resources. A notification to user 280 is provided for forwarding an electronic notification to the user 200. As should be understood, the notification to user 280 may be in the form of electronic main transmission to the user 200, or the notification 280 may be in the form of a web page posting provided by the administrator 245 to notify the user 200 he/she now has access to the desired resources. As should be understood by those skilled in the art, the forms and user interfaces illustrated in FIG. 2 are examples of suitable forms and user interfaces, but are not restrictive of additional information that may be exchanged between a user and a resources provider. Likewise, other suitable user interfaces and formats may be used.

Figure 3:
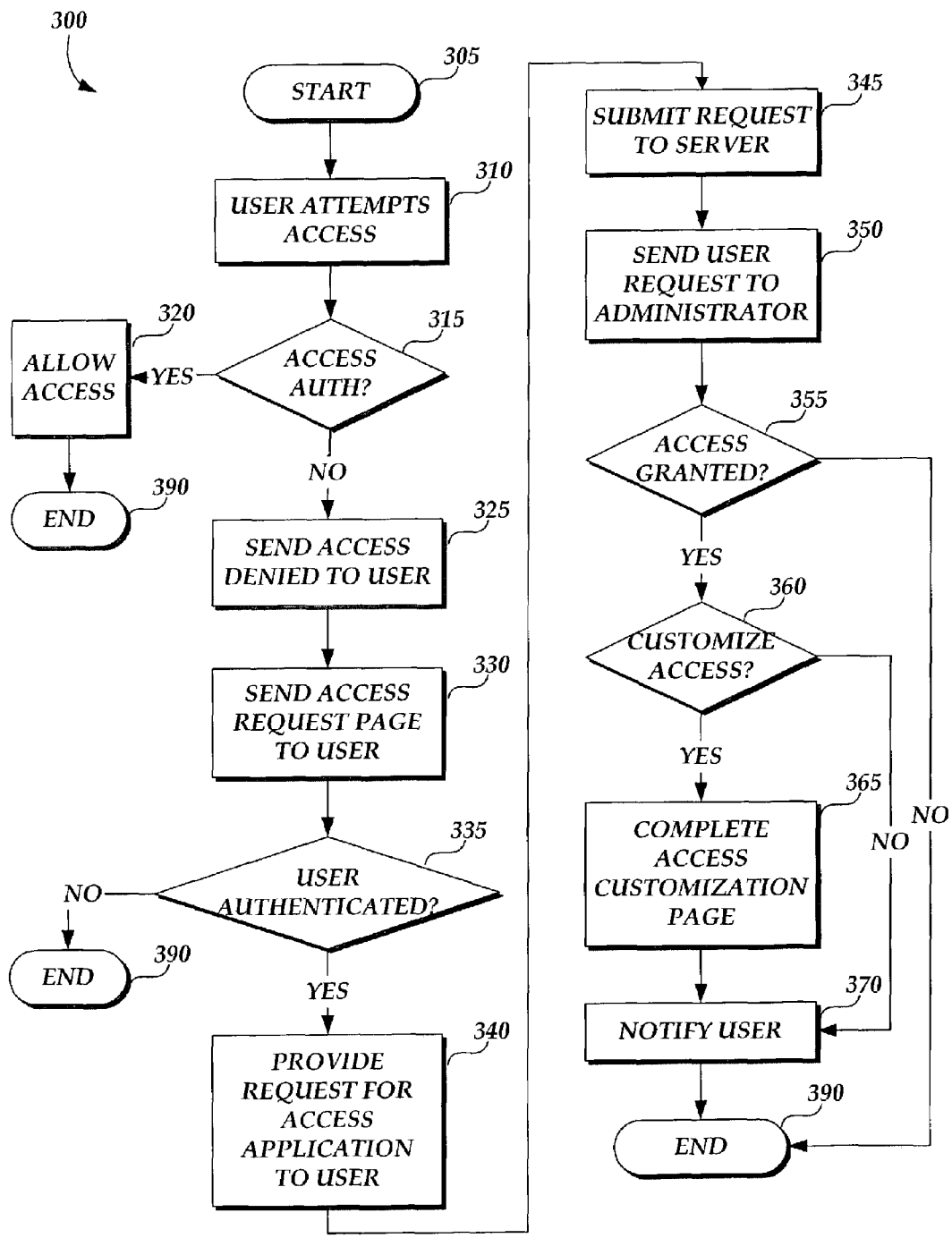
FIG. 3 is a flow chart illustrating a method for requesting access by a user to a resource provider for obtaining access to resources maintained by the resource provider.

The following description of FIG. 3 is made with reference to FIGS. 1 and 2. For purposes of description of FIG. 3, assume, for example, that a user 200 seeks access to and Internet-based web page provided by a resources server 210. The method 300 begins at start step 305 and proceeds to step 310 where the user 200 attempts access from the user's computer 20 to a desired web page from a web server 210 via the Internet through a wide area network 52, such as illustrated in FIG. 1. As should be understood, the user may seek access to a variety of data maintained by a resources provider via the resources server 210.

In step 315, a determination is made as to whether the user is authorized to have access to the desired web page. In step 315, the program module 212 parses the list of authorized users 215 to determined whether the user 200 is on the list of authorized users. If the user 200 is on the list of authorized users, the method proceeds to step 320 and the user is allowed access to the desired web page. The method ends at step 390. If the user is not located on the list of authorized users 215, the method proceeds to step 325 and the program module 212 via the web server 210 sends an access denied notification 220 to the user 200. According to one embodiment, if the user 200 is connected to the resources server 210 via the Internet, the access denied notification may be presented to the user 200 as an Internet-based web page. According to an alternative embodiment, the access denied notification 220 may be sent to the user 200 as an electronic mail transmission or as an attachment to an electronic main transmission.

At step 330, the user 200 selects the link 222 for obtaining an access request page 225 from the server 210. If the user 200 is connected to the server 210 via the Internet, the request for access may be provided as an Internet-base web page in response to selection of the link 222. Alternatively, the access request page may be in the form of an electronic mail transmission or as an attachment to an electronic mail transmission sent to the user.

Once the user 200 sends the access request page 225, an authentication process is commenced at step 335 to determine whether the user 200 may forward an access request page to the server 210. As should be understood by those skilled in the art, the authentication process may be any suitable process for determining that the user 200 is from a trusted source from which the resource provider is willing to accept communication. For example, if the user's 200 electronic mail address is an electronic mail address contained on a list of trusted addresses, the user 200 may be authenticated. The user 200 may utilize a particular network service for accessing the server 210, and the user 200 may be authenticated by verifying with the user's network that the user's electronic mail address is associated with a trusted source of electronic mail addresses. Authentication programs for authenticating a user/source are well known to those skilled in the art, for example, Passport® manufactured by Microsoft Corporation of Redmond, Wash. As should be understood, an authentication program module, such as Passport®, may be operated at the resources server 210, at a user's computer 20, or at a computing device functionally situated between the user's computer 20 and the resources server 210. If the user 200 is not authenticated at step 335, the method ends at step 390, and the user is denied access to the resources of the server 210 until the user makes arrangements for proper authentication.

If the user is authenticated at step 335, the method proceeds to step 340 and the user is provided a request for access application 235 as illustrated in FIG. 2. According to an exemplary embodiment of the present invention, the user information 237 of the notification 235 may be populated with information useful to the administrator of the server 210 including the user's name, electronic mail address, and authentication data, such as the network with which the user is registered as a trusted user or authentication user identification provider by the authentication module 230. The message text box 240 may be completed by the user to provide a text message to the administrator 245 of the server 210 to describe the nature of the desired access. For example, the user may specify the reason of which the user desires access, and an indentation for a particular web page, document, spreadsheet, or database to which the user desires access. At step 345, the request for access application 235 is sent by the user 200 to the server 210 so that the user may request access to the desired resources. In the case of an Internet-based server 210, the request for access application 235 may be sent to the server via the Internet. Likewise, the application may be sent to the server via an Intranet based network, or in the case of an electronic mail transmission, the application 235 may be forwarded to the resource server as an electronic mail transmission or as an attachment to an electronic mail transmission.

At step 350, the request for access application 235 is forwarded to the administrator 245. Advantageously, the user 200 completes the request for access application 235 and forwards the application to the administrator 245 via the server 210 without any knowledge of the identity of the administrator 245 or without the need to independently contact the administrator 245 directly via an electronic mail transmission, telephone call, or facsimile transmission, or the like. The user information 252 containing useful information on the user is provided to the administrator, and the user message 255 containing a text message entered by the user 200 is provided to the administrator 245. Once the administrator 245 reviews the user information 252 and the user message 255, the administrator 245 may decide whether to grant access of the desired resources to the user 200. According to one embodiment of the present invention, the administrator 245 may select the accept link 257 or the denied link 260.

At step 355, a determination is made as to whether the administrator 245 grants access to user 200 of the desired resources of the server 210. If not, the method proceeds to step 390 and ends. If access is not granted by the administrator 245, the user may simply be denied access to the desired resources. Or, the user may be forwarded a notification 280 via the server 210 that the user has been denied access to the desired resources. A second access denied page 220 may be sent to the user 200 as described above. If access is denied to the user, a counter may be operated by the program module 212 to limit the number of access attempts by the user 200 during a given period. For example, program module 212 may be programmed to prevent a user 200 from attempting access to the desired resources more than 10 times in a given day. Similarly, the authentication process 230 may be utilized to control the number of access attempts made by a given user 200 during a give period of time.

If the administrator 245 selects accept link, the method proceeds to step 360 and the determination is made as to whether the administrator 245 desires to customized the access granted to the user 200. If not, the method proceeds to step 370 and the user 200 is notified that the user has been granted access to the desired resources, for example a desired web page or document. According to one embodiment of the present invention, the user may receive a notification page or the user may simply be granted access to the desired resource by the having the desired resource open to the user.

Referring back to step 360, if the administrator 245 desires to customize the access granted to the user 200, then at step 365 the administrator 245 may utilize the access customization page 265 to designate the particular type of access granted to the user 200. For example, the administrator 245 may select the "read" check box 270 to grant the user "read only" access to the desired resources. Alternatively, the administrator may select the "write" check box 235 to grant the user "read/write" access to the desired resource. At step 370, if desired, the administrator 245 may notify the user of the granted access including any customized access privileges designated by the administrator 245.

It will be apparent to those skilled in the art that various modifications or variations may be made in the present invention without departing from the scope or spirit of the invention. Other embodiments of the invention will apparent to those skilled in the art from consideration of the specification and practice of the invention disclosed herein.

We claim:

1. A method of automating a request for access to a restricted computer accessible resource, comprising:
   attempting access by a user to a desired resource at a resource server;
   receiving the access attempt at a resource provider through the resource server, the resource provider comprising an administrator of the desired resource, wherein the access attempt at the resource provider is received only when the administrator has not set a program module to prevent requests for access to the resource;
   if the desired access is not authorized, notifying, from the resource server, the user that access is denied;
   providing, from the resource server, the user a request for access application for returning to the resource provider, the request being free of information identifying the administrator;
   allowing the user to send the request, through the resource server, for access application to the resource provider in response to notifying the user that access is denied without providing the user the identity of the administrator of the desired resource and without providing the user the address of the administrator of the desired resource;
   sending, from the resource server, the request for access application to the resource provider;
   at the resource provider, reviewing the request for access application and determining whether access to the desired resource is granted; and
   if access to the desired resource is granted at the resource provider, granting the user access to the desired resource.

2. The method of claim 1, after the step of receiving the access attempt at the resource provider, further comprising the step of, at the resource provider, parsing a list of authorized users of the desired resource to determine whether the user is authorized to access the desired resource.

3. The method of claim 1, prior to the step of sending the request for access application to the resource provider, authenticating the user as being associated with a trusted source from which communication to the resource provider is accepted.

4. The method of claim 3, whereby the request for access application includes identification information for the user.

5. The method of claim 4, whereby the request for access application includes a message field for entering data describing the nature of the requested access.

6. The method of claim 5, after the step of providing the user a request for access application for sending to the resource provider, entering into the request for access application data describing the nature of the requested access.

7. The method of claim 1, prior to the step of determining whether access to the desired resource is granted, further comprising the step of providing a user access page to the resource provider for granting or denying access to the desired resource.

8. The method of claim 1, whereby the step of generating access of to the desired resource by the user includes granting limited access to the desired resource by the user.

9. The method of claim 8, whereby the step of granting limited access to the desired resource by the user includes granting "read only" access to the desired by the user.

10. The method of claim 9, whereby the step of granting limited access to the desired resource by the user includes granting "read and write" access to the desired resource by the user.

11. The method of claim 8, whereby the step of granting limited access to the desired resource by the user includes granting access to the desired resource by the user for a limited duration of time.

12. The method of claim 1, whereby the step of attempting access by a user to a desired resource includes attempting access via a distributed computing environment.

13. The method of claim 12, whereby the distributed computing environment is the Internet.

14. The method of claim 13, whereby the desired resource is maintained at an Internet-based server.

15. The method of claim 1, whereby the step of attempting access by a user to a desired resource includes attempting access via an electronic mail system.

16. The method of claim 1, whereby the desired resource is computer accessible data.

17. The method of claim 16, whereby the computer accessible data includes an Internet-based web page.

18. The method of claim 16, whereby the computer accessible data includes a computer accessible document.

19. The method of claim 16, whereby the computer accessible data includes a computer accessible database.

20. The method of claim 16, whereby the computer accessible data includes a computer accessible spreadsheet.

21. A method of automating a request for access to a restricted computer accessible resource, comprising:
    sending an access attempt from a client computer to a resources server for obtaining access a desired resource maintained on the resources server;
    receiving the access attempt at the resources server, wherein the access attempt at the resources server is received only when the administrator has not set a program module to prevent requests for access to the resources server;
    at the resources server, parsing a list of authorized users of the desired resource to determine whether a user sending the access attempt is authorized to access the desired resource;
    if the desired access is not authorized, sending the user an access denied notification at the client computer;
    providing the user a request for access application for returning to the resources server;
    allowing the user to send the request for access application from the client computer to the resources server without providing the user the identity or address of a provider of the desired resource;
    sending the request for access application to the resources server;
    at the resources server, reviewing the request for access application and determining whether access to the desired resource is granted wherein determining whether access to the desired resource is granted comprises verifying with a network service provider of the user that the user is associated with a trusted source; and
    if access to the desired resource is granted, granting the user access to the desire resource.

22. The method of claim 21, after the step of providing the user a request for access application, entering into the request for access application data describing the nature of the requested access.

23. The method of claim 21, prior to the step of determining whether access to the desired resource is granted, further comprising the step of providing a user access page to the resource provider for granting or denying access to the desired resource.

24. The method of claim 21, whereby the step of granting access of to the desired resource by the user includes granting limited access to the desired resource by the user.

25. The method of claim 21, whereby the step of sending an access attempt from a client computer to a resources server for obtaining access a desired resource maintained on the resources server includes sending the access attempt via a distributed computing environment.

26. The method of claim 25, whereby the distributed computing environment is the Internet.

27. A system of automating a request for access to a restricted computer accessible resource, comprising:
    a client computer operative to send an access attempt to a resources server for obtaining access a desired resource maintained on the resources server;
    a program module at the resources server operative to:
        receive the access attempt at the resources server, wherein the access attempt at the resources server is received only when the administrator has not set a program module to prevent requests for access to the resources server;
        parse a list of authorized users of the desired resource to determine whether a user sending the access attempt is authorized to access the desired resource;
        send the user an access denied notification at the client computer if the desired access is not authorized;
        provide the user a request for access application for returning to the resources server, the request for access application including a first field for receiving a reason for which the user desires access to the desired resource and a second field for indentifying at least one of the following associated with the desired resource: a web page, a document, a spreadsheet, and a database; and
        allow the user to send the request of access application from the client computer to the resources server without proving the user the identity or address of a provider of the desired source;
    the client computer further operative to send the request for access application to the resources server; and
    the program module at the resources server further operative to:
        pass the request for access application to a provider of the desired resource for a determination of whether access to the desired resource is granted; and
        allow the user access to the desired resource if access to the desired resource is granted.

28. The system of claim 27, further comprising an authentication program module operative to authenticate the user as being associated with a trusted source from which communication to the resources server is accepted.

29. The system of claim 27, whereby the program module at the resources server is further operative to provide a user access page to the resource provider for granting or denying access to the desired resource.

30. The system of claim 27, whereby the client computer is further operative to send the access attempt to the resources server via a distributed computing environment.

31. A computer readable medium containing instructions which when executed by a computer perform the steps of:

receiving an access attempt from a client computer sent to a resources server for obtaining access a desired resource maintained on the resources server, wherein the access attempt from the client computer is received only when an administrator has not set a program module to prevent requests for access to the resources server;

parsing a list of authorized users of the desired resource to determine whether a user sending the access attempt is authorized to access the desired resource;

sending the user an access denied notification at the client computer if the desired access is not authorized;

proving the user a request for access application for returning to the resources server;

allowing the user to send the request for access application from the client computer to the resources server without providing the user the identity or address of a provider of the desired resource;

receiving the request for access application to the resources server;

forwarding the request for access application to a provider of the desired resource for a determination of whether access to the desired resource is granted wherein the determination comprises determining whether access to the desired resource is granted comprises verifying with a network service provider of the user that an electronic mail address of the user is associated with a trusted source; and allowing the user access to the desired resource if access to the desired resource is granted.

32. The computer readable medium of claim 31, after the step of forwarding the request for access application to a provider of the desired resource, providing a user access page to the resource provider for granting or denying access to the desired resource.

33. A system of automating a request for access to a restricted computer accessible resource, comprising an access request program module resident on a resources server containing computer implementable instructions which when implemented by a computer of the resources server is operative to:

parse a list of authorized users to determine whether a user is authorized for access to resources of the resources server;

forward an access denied notification and an access request page to the user;

receive a request of access application from the user after authentication of the user as being from a trusted source from which the resources server will accept communication, the request of access application including a first field for receiving a reason for which the user desires access to the resource and a second field for identifying at least one of the following associated with the resource: a web page, a document, a spreadsheet, and a database, wherein the access application from the user is received only when the administrator has not set the program module to prevent requests for access to the resources server;

forward information contained in the request for access application to an administrator of the resources of the resources server;

provide the administrator a user access page for allowing the administrator to allow or deny access to the resources by the user; and accept input from the administrator.

34. The system of claim 33, whereby the an access request program module is further operative to provide an access customization page to the administrator for allowing the administrator to customize access granted to the user.

* * * * *